Figure 1:
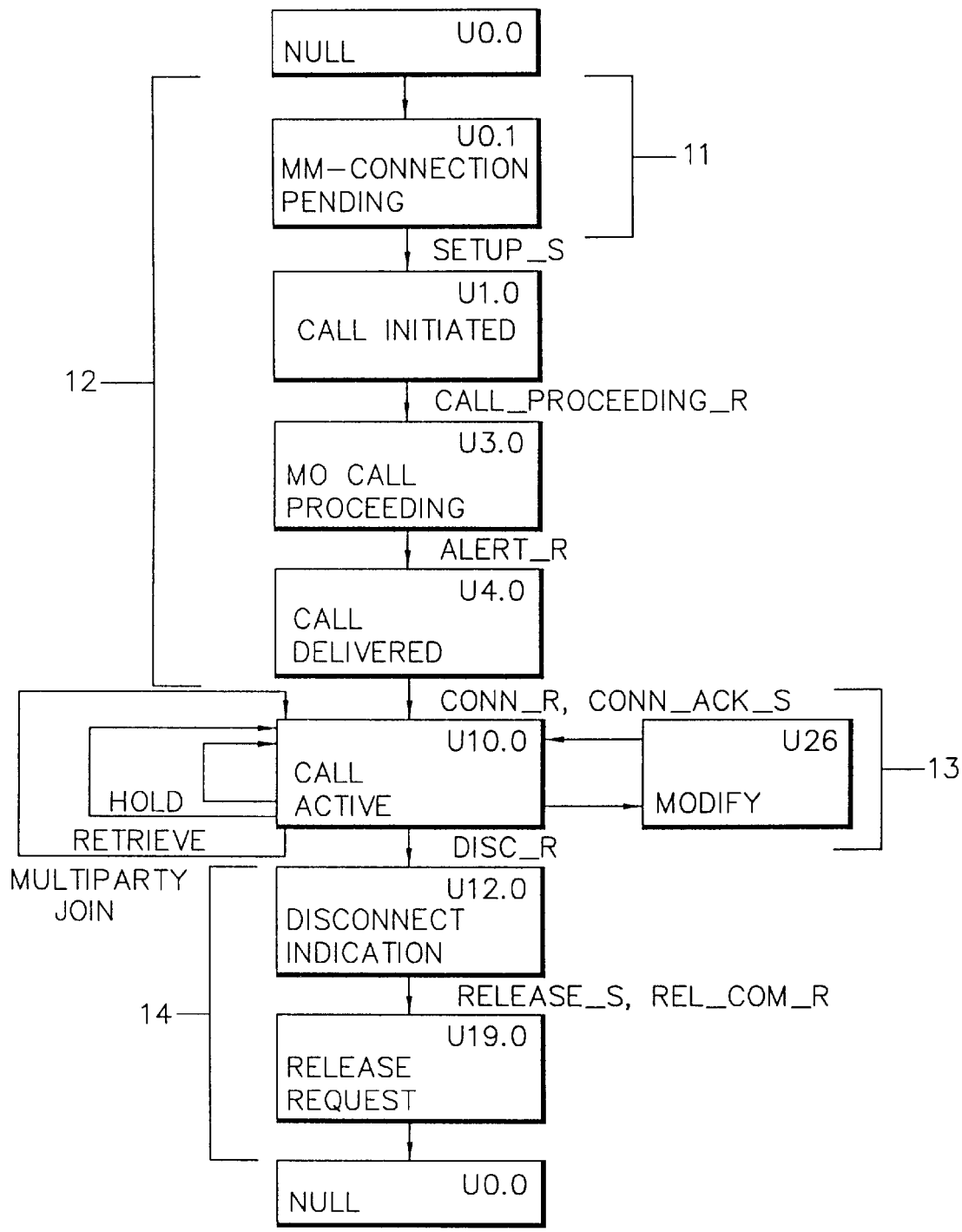

United States Patent [19]

Hietalahti

[11] Patent Number: 5,995,825
[45] Date of Patent: Nov. 30, 1999

[54] RADIO TELEPHONE SYSTEM IN WHICH A MOBILE PHONE CAN RECEIVE A CONTROL MESSAGE ANNOUNCING THE ARRIVAL OF A NEW CALL DURING AN ONGOING CALL

[75] Inventor: Hannu Hietalahti, Koukkutie, Finland

[73] Assignee: Nokia Mobile Phones, Ltd., Espoo, Finland

[21] Appl. No.: 08/809,090

[22] PCT Filed: Sep. 11, 1995

[86] PCT No.: PCT/FI95/00491

§ 371 Date: Jun. 20, 1997

§ 102(e) Date: Jun. 20, 1997

[87] PCT Pub. No.: WO96/08937

PCT Pub. Date: Mar. 21, 1996

[30] Foreign Application Priority Data

Sep. 14, 1994 [FI] Finland ................................. 944245

[51] Int. Cl.⁶ ........................................................ H04Q 7/20
[52] U.S. Cl. ............................................. 455/414; 455/567
[58] Field of Search .................................. 455/414, 401, 455/422, 434, 445, 515, 567

[56] References Cited

U.S. PATENT DOCUMENTS

| 4,599,490 | 7/1986 | Cornell et al. | 455/414 |
|---|---|---|---|
| 4,829,554 | 5/1989 | Barnes et al. | 455/422 |
| 5,175,758 | 12/1992 | Levanto et al. | 379/57 |
| 5,394,391 | 2/1995 | Chen et al. | 370/18 |
| 5,570,413 | 10/1996 | Ahlberg et al. | 455/566 |
| 5,581,596 | 12/1996 | Hogan | 455/560 |
| 5,649,301 | 7/1997 | Yabusaki et al. | 455/433 |

FOREIGN PATENT DOCUMENTS

| 0 650 306 | 4/1995 | European Pat. Off. . |
|---|---|---|
| 32 03 052 | 8/1983 | Germany . |
| 2 275 847 | 9/1994 | United Kingdom . |
| WO 93/11625 | 6/1993 | WIPO . |
| WO 93/21697 | 10/1993 | WIPO . |
| WO 93/21741 | 10/1993 | WIPO . |

Primary Examiner—Dwayne D. Bost
Assistant Examiner—Myron K. Wyche
Attorney, Agent, or Firm—Perman & Green, LLP

[57] ABSTRACT

In a radio telephone system including subscriber devices, such as mobile phones, that function in a network wherein a control channel is used to transfer call control messages between the network and a subscriber device, and a call consists of three consecutive phases involving a connection setup phase, an information transfer phase, and a connection termination phase, with the setup and termination phases including messages on the control channel, a call waiting service in which the network sends the subscriber device a control message announcing the arrival of a new call via the control channel, which service is valid in desired phases or parts of phases of the call.

11 Claims, 5 Drawing Sheets

RADIO TELEPHONE SYSTEM IN WHICH A MOBILE PHONE CAN RECEIVE A CONTROL MESSAGE ANNOUNCING THE ARRIVAL OF A NEW CALL DURING AN ONGOING CALL

The invention is related to a radio telephone system comprising of subscriber devices, especially mobile phones, that function in a radio telephone network. The system has at least one control channel for transferring call control messages between the network and a subscriber device. A call is made up of three consecutive phases: connection establishment, information transfer and connection termination.

In communications terminology, a logical communications connection between two subscribers is usually defined as being made up of three consecutive phases, which are connection establishment, information transfer and connection termination. The physical connection between two subscriber devices is formed by a communications network, which in each case consists of a varying number of centers, exchanges, transmitters, receivers and other components, which not only form an information channel between subscribers, but also take part in controlling the subscriber devices connected to the communications network by utilizing different types of control signals or messages. The communications network and its various components will herein simply be referred to as the network.

In the connection establishment phase a subscriber-activated connection request, which is a control message or a group of control signals that include address and other information, is sent to the network, which creates a physical connection to the receiving subscriber and submits an information channel for use by the subscribers. During the information transfer phase information is transferred from one subscriber to the other via the previously reserved information channel.

The connection is also terminated by an exchange of control signals or messages between the subscribers and the network. The physical connection is usually disconnected by a termination acknowledgement sent by the party initiating the termination.

A radio telephone network is usually made up of several base stations and base station controllers that control them. The subscriber devices defined in the terminology presented above are usually mobile phones. The radio interface between the radio telephone network and a subscriber device is defined by network standards such as NMT, GSM, DCS1800, PCS1900, AMPS and TACS. Radio telephone networks that adhere to these standards are usually regional networks.

In the radio interface of cellular networks defined by the GSM, DCS1800 and PCS1900 specifications, the communications connection defined above is a call, in which the states and changes of state related to the connection establishment, information transfer and connection termination phases are controlled by control messages, called Messages for circuit-switched call control, between the subscriber device and the network. Connection establishment messages are: ALERTING, CALL CONFIRMED, CALL PROCEEDING, CONNECT, CONNECT ACKNOWLEDGE, EMERGENCY SETUP, PROGRESS and SETUP. During the information transfer phase, i.e., while the call is active, MODIFY, MODIFY COMPLETE, MODIFY REJECT, USER INFORMATION messages and Supplementary Services HOLD and RETRIEVE messages can be sent. Connection termination messages are: DISCONNECT, RELEASE and RELEASE COMPLETE. The Supplementary Services, SS, of the interface defined by the specifications also include other control messages, and so do the other special cases that are defined as belonging to the interface, such as FACILITY messages, for example. The definitions of these control messages are extensively presented in chapter 9.3, Messages for circuit-switched call control, pages 249–302 in the publication "GSM Technical Specification 04.08", for example, which publication is included in this application by merit of references to the contents of said messages.

Figure 2:
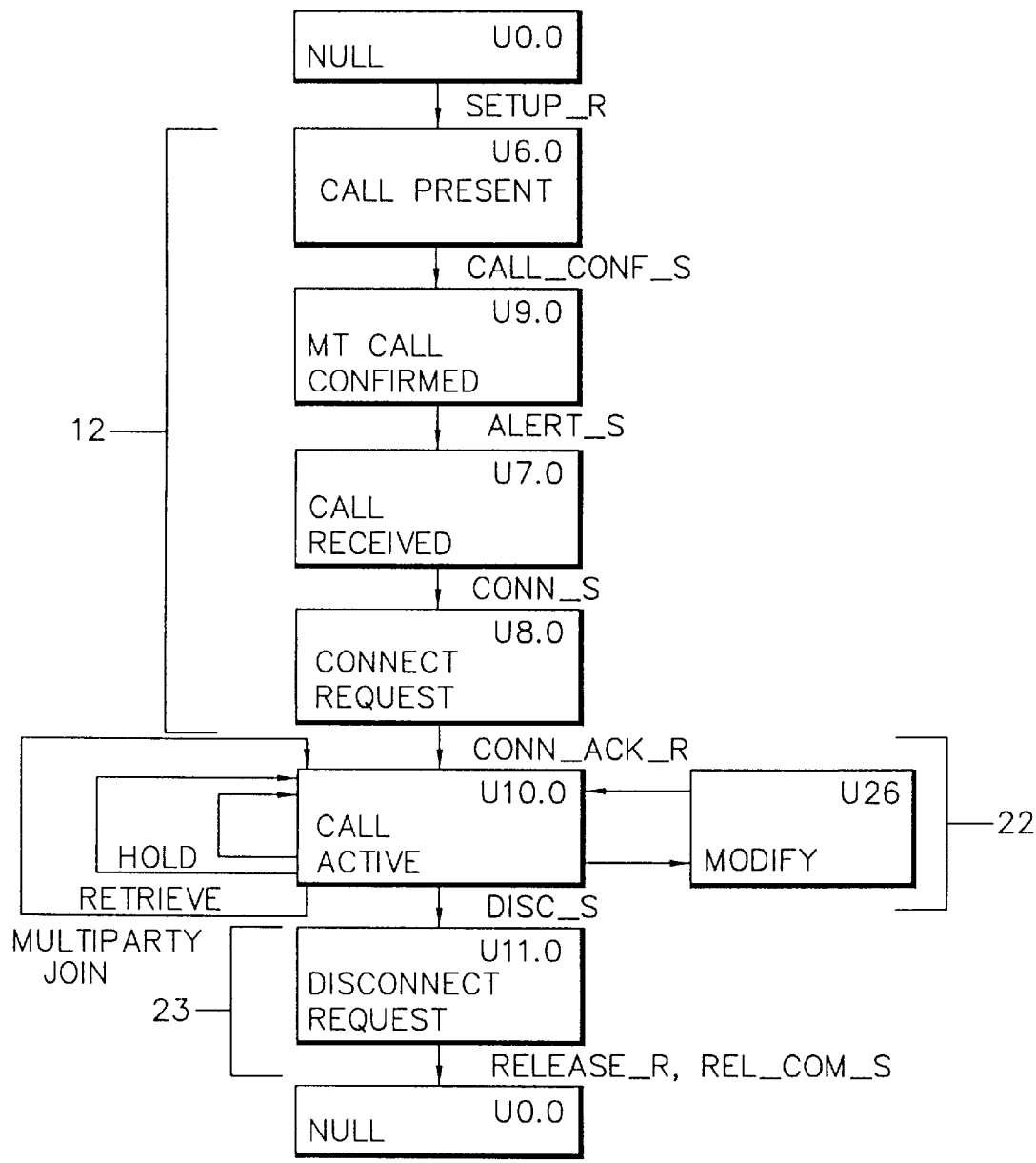

FIG. 1 shows an example of the phases of a GSM, DCS1800 or PCS1900 specification call with the help of a state diagram. In the example in FIG. 1, the connection establishment phase is mobile originated, MO. States of the connection setup phase 12 are U0.1 (MM-connection pending), U1.0 (Call initiated), U3.0 (MO call proceeding) and U4.0 (Call delivered). Control message signalling presented above is preceded by channel reservation 11. The information transfer phase 13 is made up of U10 (Active) and possibly U26 (Modify) states. In the U10 (Active) state the call can be placed on hold and retrieved with the HOLD and RETRIEVE messages presented in the figure. This phase may also contain MULTIPARTY services defined by the specification. Connection termination phase 14 is mobile terminated, MT. MT termination is activated with a DISCONNECT message sent from the network to the subscriber. In practice, termination is usually initiated by the subscriber device at the other end of the network, to which the connection exists. Connection termination phase states are U12 (Disconnect indication) and U19 (Release request). Changes from one state to the next are activated by the control messages presented above, whose directions in the figure are depicted by the extensions _S, transmission from the subscriber to the network, or _R, reception from the network by the subscriber. Another example of a call state diagram is shown in FIG. 2. In this example, the connection setup is mobile terminated, MT, and the connection termination is mobile originated, MO. Connection setup phase 21 states are: U6.0 (Call present), U9.0 (MT call confirmed), U7.0 (Call received) and U8.0 (Connect request). information transfer phase 22 states are, as in the example in FIG. 1, U10 (Active) and U26 (Modify). Connection termination phase 23 is made up of state U11 (Disconnect request). It is known that a call can consist of different combinations of both mobile originated and mobile terminated connection setup and connection termination phases. The information transfer phase is the same in all combinations. The call control is usually implemented at both the subscriber and network ends with a state machine.

Figure 3:
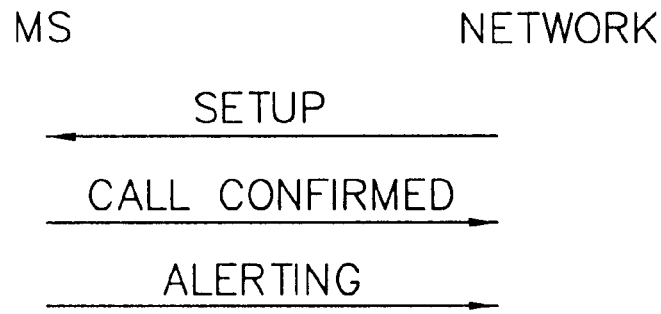

GSM specification 04.83 section 1.1 defines the signalling sequence of the call waiting service, with which the network informs the subscriber device of an arriving call when the subscriber already has at least one call. According to the specification, the call waiting service can only be valid if the subscribers present call is in the U10 (Active) or U26 (Modify) state of the information transfer phase. FIG. 3 shows the signal sequences between the network NETWORK and the subscriber device MS that are related to the call waiting service. A call waiting message received during the U10 and U26 states, which is the same as the SETUP connection request that initiates a connection setup, is confirmed to the network with a CALL CONFIRMED acknowledgement, which contains "user busy" information. An ALERTING message informs the network of an alarm sent to the user. Alarm may be a knocking signal or clear text appearing in the display of the phone. The user then decides whether to answer, if the user does not wish to take the call, a DISCONNECT message initiating a normal connection termination is sent after the CALL CONFIRMED, ALERTING sequence shown in FIG. 3. Receipt of a call waiting message always initiates a new call control state machine in the system. The user takes the new call by placing the present call in a hold state with the HOLD message as shown in FIGS. 1 and 2, and then answering the call waiting call as normal.

Call waiting service realized in the above manner has disadvantages and limitations. Throughout the call, during all of its phases: connection establishment, information transfer, connection termination, the subscriber is busy as far as the network is concerned, which condition is indicated by a "user busy" state maintained by the network. The GSM specification defines the call waiting service as being valid only in the U10 (Active) and U26 (Modify) states of the subscriber's present call. Therefore, according to GSM specification 04.83, a call waiting message that announces an arriving call, i.e., a SETUP message, can not be sent from the network to the subscriber during the information transfer phase, except during the said states, Active and Modify, or during the connection establishment and connection termination phases.

In practice, a problem is caused by the mobile originated, MO, connection setup phase 12 connection establishment sequences and the mobile terminated, MT, connection termination phase 14 call termination sequences shown in FIG. 1, which sequences may last quite long. During these phases the subscriber can not be reached according to the GSM specification, even though the subscriber actually is free to receive a new call if so desired.

Figure 4:
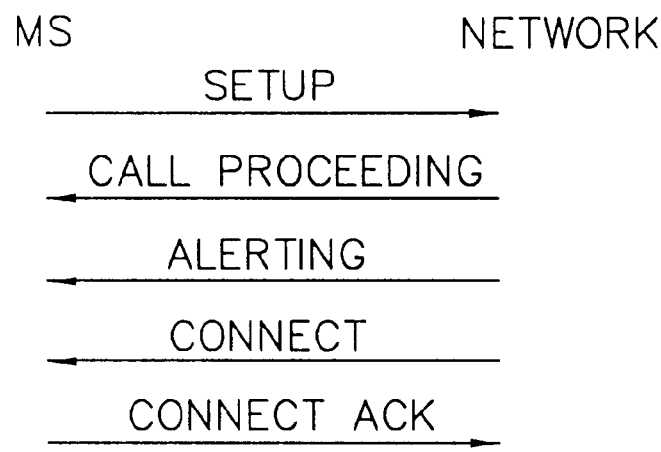

FIG. 4 shows a signalling sequence of a mobile originated connection setup according to the GSM specification. The connection establishment begins with a connection request, SETUP, sent to the network NETWORK by the subscriber MS, containing address and other information needed to set up the connection. The network acknowledges the receipt of the connection information by sending the subscriber a CALL PROCEEDING connection request acknowledgement, after which the subscriber waits in the U3.0 state for an ALERTING message from the network, as shown in FIG. 1, which message announces that the connection is being set up and that an alarm is being given at the receiving subscriber's end. After this the subscriber waits in state U4.0 for the call to be answered, until the network announces with a CONNECT message that the call has been answered at the receiving subscribers end. States U3.0 and U4.0 may last a long time in a mobile originated connection establishment. This is especially so when the receiving subscriber is far away, e.g., several separate radio telephone networks away, or when the arriving call is not answered at the receiving subscriber's end. The total duration of these states may be up to several minutes.

Figure 5:
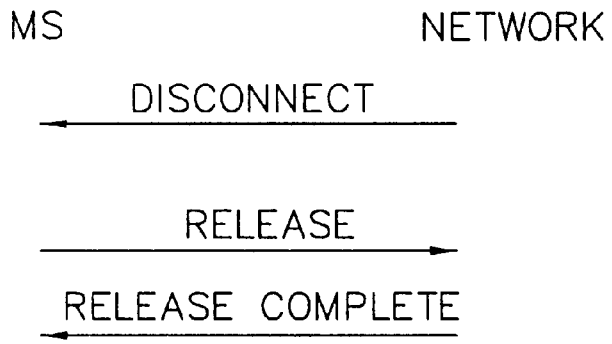

FIG. 5 shows a signalling sequence of a mobile terminated connection termination according to the GSM specification. The termination is activated by a DISCONNECT message sent by the network NETWORK, which changes the call to the U12 (Disconnect indication) state shown in FIG. 1. The subscriber device MS responds to the termination request with a RELEASE message, which is acknowledged by the network with a RELEASE COMPLETE termination acknowledgement. As far as the user of the subscriber device is concerned, the call has already been terminated in the U12 state and there is no way that the call can be returned to the active state U10. Termination of the call lasts particularly long, up to 30 seconds, if the DISCONNECT message sent by the network indicates a so-called "in band" message, which may be a recorded message, for example. It is probable that the telephone user usually would rather receive a new call than listen to the "in band" message generated by the network.

The problematic situations presented in the above examples that are related to GSM-specific connection setup and connection termination are also possible in other known radio telephone networks, particularly in the DCS1800 and PCS1900 systems.

The present invention alleviates unnecessary limitations and complications related to the reception of a new call in a situation where the subscriber already has at least one call.

According to the invention a radio telephone system including subscriber devices, particularly mobile phones, that function in a radio telephone network; and at least one control channel for transferring call control messages between the network and a subscriber device; in which system a call is made up of three consecutive phases: connection setup, which includes at least one transfer of a connection setup message in the control channel; information transfer; and connection termination, which includes at least one transfer of a connection termination message in the control channel; and in which the network is allowed to send a control message announcing the arrival of a new call, i.e., a call waiting message, via the control channel, to the subscriber device in the information transfer phase, is characterized in that the network is further allowed to send a call waiting message to the subscriber device via the control channel in the connection setup phase and/or the connection termination phase.

In the implementation described in the present invention, the network can transmit and the subscriber device, usually a mobile phone, can receive a control message announcing a new arriving call in the desired states of the present call, also in states other than U10 (Active) and U26 (Modify). Furthermore, the subscriber device informs the user of the arriving call with a suitable signal, such as a series of three short beeps, for example.

The present invention is described in detail below, with references to the enclosed drawing.

Figure 7:
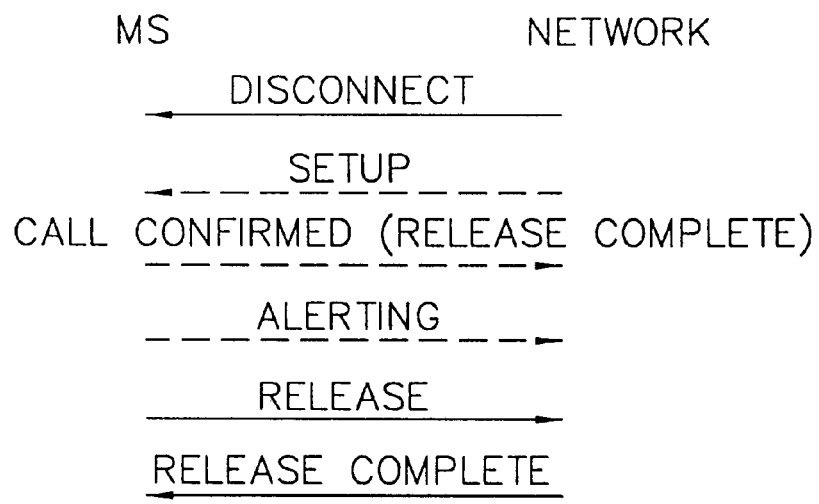
Figure 6:
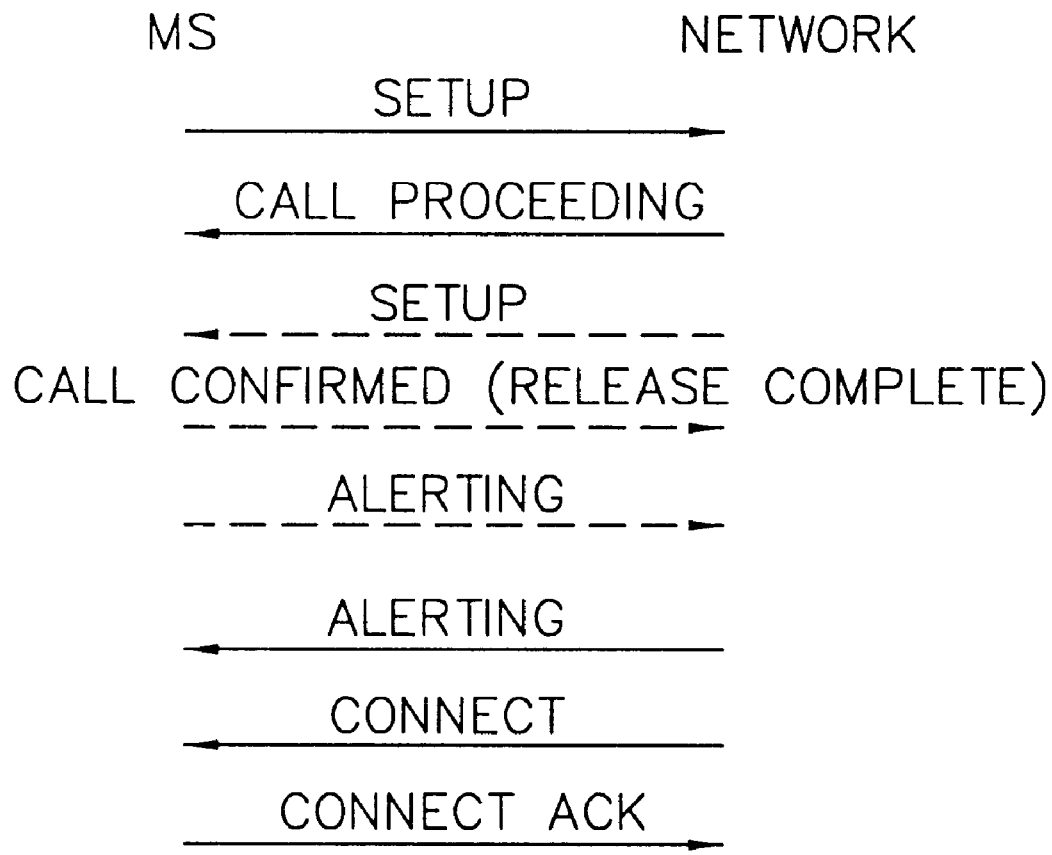

FIG. 1 shows a state diagram of a call that includes a mobile originated (MO) connection setup phase and a mobile terminated (MT) connection termination phase in the GSM, DCS1800 and PCS1900 systems according to the prior art, FIG. 2 shows a state diagram of a call that includes a mobile terminated (MT) connection establishment phase and a mobile originated (MO) connection termination phase in the GSM, DCS1800 and PCS1900 systems according to the prior art, FIG. 3 shows a signalling sequence of a call waiting service in the GSM, DCS1800 and PCS1900 systems according to the prior art, FIG. 4 shows a signalling sequence of a mobile originated connection setup procedure in the GSM, DCS1800 and PCS1900 systems according to the prior art, FIG. 5 shows a signalling sequence of a mobile terminated connection termination procedure in the GSM, DCS1800 and PCS1900 systems according to the prior art, FIG. 6 shows a signalling sequence of a mobile originated connection setup procedure in which a call waiting service is valid according to the present invention, and FIG. 7 shows a signalling sequence of a mobile terminated connection termination procedure in which a call waiting service is valid according to the present invention.

In the text that explains the figures, the GSM system is referred to as an example, but the same is also valid in the DCS1800 and DCS1900 standards. The prior art shown in FIGS. 1–5 is explained earlier in the present patent application. The connection establishment shown in FIG. 4 is modified by the present invention in a manner which is presented with the example shown in FIG. 6. In practice, the setup of a physical connection to a subscriber reachable through the network NETWORK occurs in the U3.0 state after the CALL PROCEEDING connection request acknowledgement, which state is shown in the state diagram of FIG. 1. According to the present invention the call waiting service is valid also during the connection setup phase, so a new arriving call can also be received in the U3.0 state with the known sequence of SETUP, CALL CONFIRMED and ALERTING messages shown in FIG. 6. The user is informed of the call with a knocking message, after which the user can decide whether or not to receive the call, as in the prior art. In the practical application of the present invention, the call arriving via the call waiting service initiates a new call control state machine in which the connection setup is mobile terminated, as is shown in the state diagram in FIG. 2. In the same manner, a call can be received via the call waiting service in the other states related to connection setup: U0.1, U1.0 and U4.0. In practice, another alternative place for receiving a call waiting call, or a SETUP, CALL CONFIRMED and ALERTING sequence as shown in FIG. 6, is after the ALERTING message sent from the network to the subscriber, because the alarm state U4.0 (Call delivered) may sometimes last a long time, e.g., if the receiving subscriber does not answer the telephone.

The mobile terminated connection termination sequence shown in FIG. 5 is modified by the present invention in a manner which is shown in FIG. 7. Also in the example situation shown in FIG. 7, the DISCONNECT message is sent from the network NETWORK to the subscriber device MS, and the network expects the message to be answered with a RELEASE message. According to the present invention the new call can be announced with the SETUP, CALL CONFIRMED and ALERTING sequence also in the Disconnect indication state U12, after the DISCONNECT message, FIG. 1. The setup of the new connection proceeds as normal in the new state machine activated by the call waiting call. The termination of the previous call can proceed with the RELEASE and RELEASE COMPLETE messages independently of the new connection setup. Contrary to the example shown in FIG. 5, the network can also send a RELEASE message if the timer T306 of GSM specification 04.08 changes to the timeout state.

In a mobile terminated connection setup and a mobile originated connection termination, FIG. 2, the present invention does not achieve the above mentioned benefits, because the connection setup phase 21 and the connection termination phase 23 are short in duration in this case. It is not even sensible to allow the call waiting service during the mobile terminated connection setup phase, because the only thing that may unnecessarily stretch the connection setup is the case where the user does not answer the telephone. The connection termination phase naturally is short in duration, because the DISCONNECT and RELEASE messages are sent at nearly the same time that the user terminates the call, e.g., with the telephone's END CALL button.

The decision to take the incoming call and place the present call in the hold state is also left to the user of the subscriber device in the present invention in the same manner as in the prior art. In an alternative implementation of the present invention, the network can close the call waiting service so that it is not available to the subscriber and decide whether to take the new call and terminate the present call on behalf of the subscriber.

If the subscriber already has two calls, one being in one of the three phases of a call presented above, and the other being in the information transfer phase, but in the hold state, offering waiting call as described in the present invention can be allowed. In this situation the user must decide which two calls he or she wishes to keep, because as is known, it is impossible to maintain a third call in the GSM system without a MULTIPARTY function.

It is advantageous to allow the call waiting service described in the present invention in the GSM, DCS1800 and PCS1900 systems during all of the phases shown in FIG. 1: connection establishment 12, information transfer 13 and connection termination 14, especially between the acknowledgement of the connection request, CALL PROCEEDING, and the acknowledgement of the termination, RELEASE COMPLETE.

Allowing the call waiting service during states other than the U10 (Active) and U26 (Modify) states of the information transfer phase is experienced by mobile phone users as flexibility, because the lengthy connection setup and connection termination sequences no longer limit accessibility in the network. Implementation of the present invention in the GSM, DCS1800 or PCS1900 system requires modification of the radio interface specification related to the validity of the call waiting service presented above.

The present invention also simplifies signalling related to the setting up of a call. Setting up a new call in a radio telephone system normally requires that a new channel is reserved, which is done at the beginning of the connection setup phase, like the channel reservation phase 11 shown in FIG. 1. With the present invention, an increasing number of calls can be taken while the control and speech channels are already existing and usable, e.g., after the U12 (Disconnect indication) state of the previous call. In principle, these channels are exploitable during the next call.

The present invention can be implemented in existing call control state machines by modifying the software in both the subscriber devices and the network.

The present invention is not limited to the GSM, DCS1800 or PCS1900 cellular systems presented in the examples, but is also applicable to other radio telephone systems as broadly as the enclosed patent claims allow.

I claim:

1. A radio telephone system including subscriber devices, particularly mobile phones, that function in a radio telephone network, and comprising at least one control channel for transferring call control messages between the network (NETWORK) and a subscriber device (MS), and in which system a call is made up of three consecutive phases, connection setup (12, 21), which includes at least one transfer of a connection setup message in the control channel, information transfer (13, 22), and connection termination (14, 23), which includes at least one transfer of a connection termination message in the control channel, characterized in that a call waiting service, in which the network sends the subscriber device a control message announcing the arrival of a new call, via the control channel, which service is valid in any of said three consecutive desired phases or parts of phases of the call.

2. The radio telephone system according to claim 1, characterized in that the network is allowed to send the call waiting message between the connection request and termination acknowledgement messages.

3. The radio telephone system according to claim 1, characterized in that the connection setup message forms at least part of the call waiting message.

4. The radio telephone system according to claim 1 or 3, characterized in that a new call is formed in the system by the impulse of the call waiting message.

5. The radio telephone system according to claim 4, characterized in that the new call uses the control channel of the previous call.

6. The radio telephone system according to claim 1, characterized in that the call waiting message is announced to the user of the subscriber device with an alarm message.

7. The radio telephone system according to claim 1, characterized in that the subscriber device sends via the control channel to the network an acknowledgement message indicating whether the new call is accepted or rejected.

8. The radio telephone system according to claim 1, characterized in that the network is a cellular network defined by the GSM, DCS1800 or PCS1900 specification.

9. The radio telephone system according to claim 8, characterized in that the network is allowed to send the call waiting message between the mobile originated connection request acknowledgement CALL PROCEEDING and the mobile terminated termination acknowledgement RELEASE COMPLETE.

10. The radio telephone system according to claim 8, characterized in that the call waiting message is a SETUP message.

11. The radio telephone system according to claim 7, characterized in that the accepting acknowledgement message is a CALL CONFIRMED message.

* * * * *